2,208,683

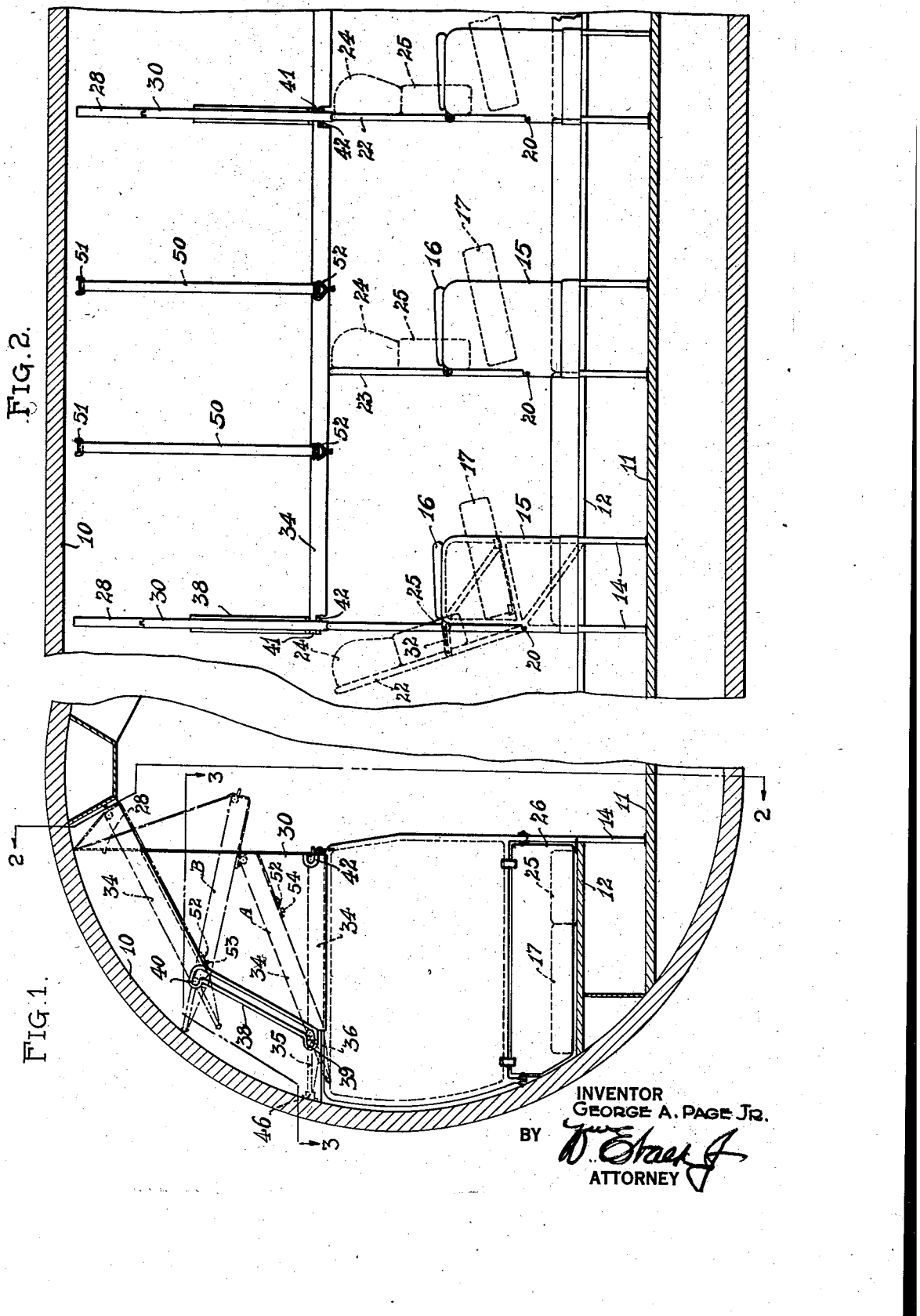
July 23, 1940.  G. A. PAGE, JR  2,208,683
AIRPLANE CABIN ARRANGEMENT
Filed June 18, 1938  2 Sheets-Sheet 1
INVENTOR
GEORGE A. PAGE JR.
BY
ATTORNEY July 23, 1940.　　　G. A. PAGE, JR　　　2,208,683
AIRPLANE CABIN ARRANGEMENT
Filed June 18, 1938　　2 Sheets-Sheet 2
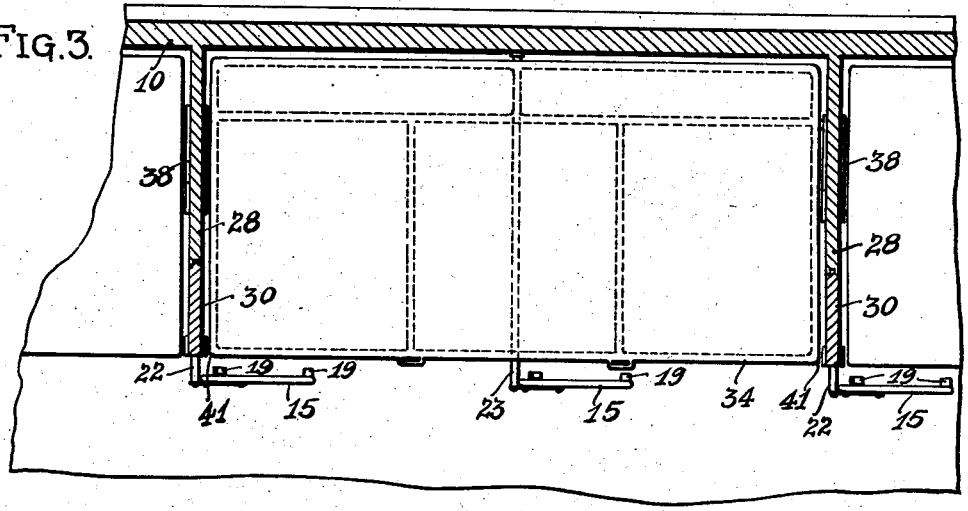
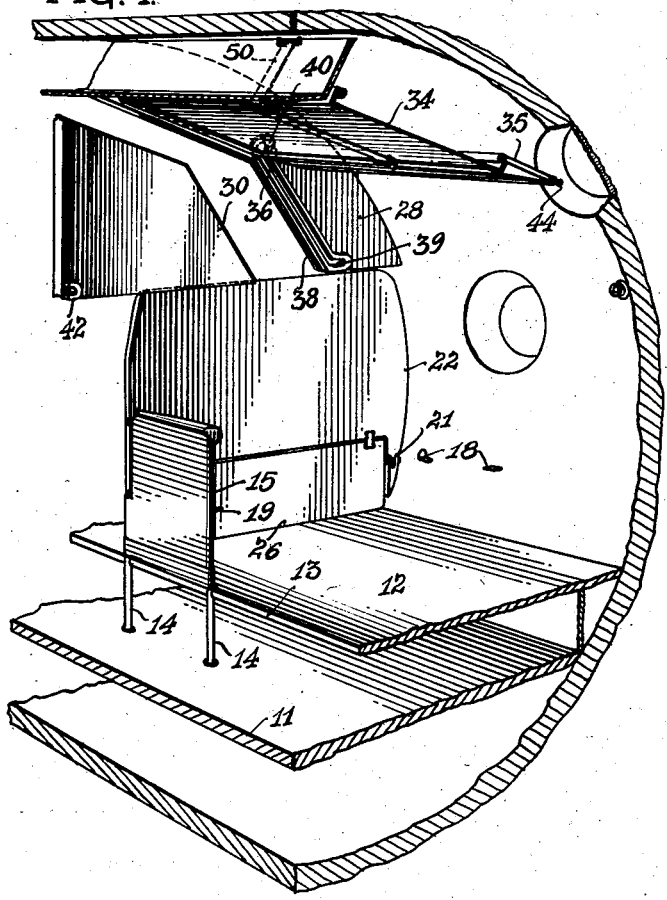
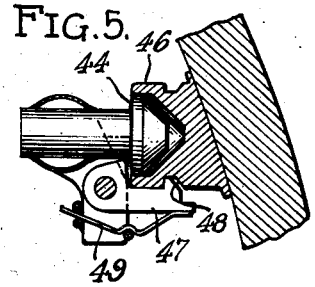
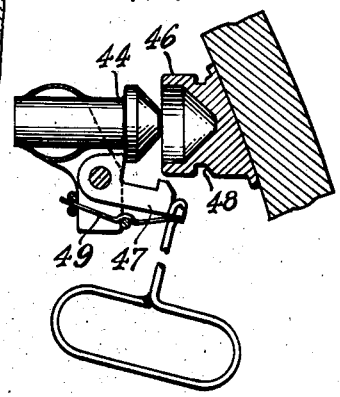
INVENTOR
GEORGE A. PAGE JR.
BY
ATTORNEY Patented July 23, 1940

UNITED STATES PATENT OFFICE 2,208,683

AIRPLANE CABIN ARRANGEMENT

George A. Page, Jr., Overland, Mo., assignor to Curtiss-Wright Corporation, a corporation of Delaware Application June 18, 1938, Serial No. 214,440

12 Claims. (Cl. 244—118)

This invention relates to convertible sleeping arrangements for vehicles, and is particularly concerned with improvements in sleeping arrangements as adapted for use in aircraft.

It is known that prior art teaches many and various forms of cabin accommodations in which seats are convertible to berths, and vice versa, and generally speaking, most organizations of this character have made serious attempts to simplify and reduce the bulk of the various structures necessary to effect conversions and to make the facilities comfortable to passengers. With the development of convertible aircraft cabins, certain new problems arise and, with the present development in aircraft adapted for extreme high altitude flight, the cabin or fuselage form is confined toward a circular cross-section, since the cabins are supercharged with air resulting in the pressure within the cabin being much higher than the atmospheric pressure without the cabin at high altitude.

An object of this invention is to provide convertible berth and passenger seating facilities within a cabin of substantially circular cross-section or substantially cylindrical in form, while at the same time allowing for a maximum amount of space.

A further object is to so dispose seating and sleeping facilities that the curved walls of the cabin do not limit unreasonably the physical activity of passengers.

Still another object is to coordinate the sleeping and seating accommodations in such a way that a minimum of space is encroached upon by the facilities themselves.

A further object is to provide for the utmost in passenger comfort and privacy while retaining great simplicity in the physical structure necessary for sleeping and seating accommodations.

Further objects and advantages will be apparent from a reading of the annexed specification and claims, together with an examination of the accompanying drawings, in which:

Fig. 1 is a cross-section through a circular aircraft fuselage showing the convertible seating and sleeping facilities;

Fig. 2 is a longitudinal section through the fuselage, being a section on the line 2—2 of Fig. 1;

Fig. 3 is a section on the line 3—3 of Fig. 1;

Fig. 4 is a fragmentary perspective elevation of the interior of the fuselage showing the facilities for sleeping accommodations; and Figs. 5 and 6 are enlarged fragmentary sectional views of fastening devices utilized in connection with the upper berth arrangement.

The system herein disclosed is particularly adapted for use in connection with a circular or nearly circular cabin or fuselage indicated at 10, a cabin of this form being appropriate for use in high altitude aircraft wherein a pressure differential is maintained between the interior and exterior of the cabin. Chordwise across a lower portion of the cabin 10 is a floor 11, the space between the floor and the cabin wall being useful for storage. From the cabin wall, auxiliary floors 12 project inwardly, these floors being elevated above the floor 11 and terminating laterally of the vertical plane of symmetry of the cabin to provide between the opposite floors 12 a central aisle. The space between the floors 11 and 12, beneath each passenger accommodation compartment, is suitable for the stowage of hand baggage. The inner edges 13 of each floor 12, are supported by stanchions 14 which rise above the floor 12 in the form of a panel 15 to provide an arm rest 16 and to provide an end terminal for a seat cushion 17. Pads 18 are fixed to the side wall of the fuselage, and pads 19 are fixed to the panel 15 upon which the seat cushion 17 is supported.

Preferably, the distance between alternate panels 15 is of the order of six and one-half feet, this distance being adequate for a full length berth. The panels 15 each have a hinge 20, and the cabin wall is provided with opposite hinges 21 upon which frames 22 and 23 are supported. These frames are tiltable about their hinges 20 and 21 to a vertical position, as shown in solid lines in the figures and to a rearwardly tilted position, as shown in dotted lines in Fig. 2, for a purpose presently to be described. The frames 22 are constructed as solid panels to provide end partitions between tandem compartments, while the frame 23 preferably is merely a tubular external frame over which a fabric sleeve may be placed when the frame is disposed for use as a seat back. Back cushions, such as 24 and 25 are attached by any suitable means to the frames 22 and 23.

In order to provide privacy in the individual compartments, an apron 26 is hinged to the bottom of each back frame 22 so that, when the cabin is made up for sleeping, these aprons separate adjacent compartments. However, when made up for seated passengers, the aprons 26 may be swung upwardly to lie beneath the seat cushions 17 so that foot room is available for passengers seated rearward of respective frames 22. The upper part of the cabin is provided with a built-in screen 28 extending a short distance inwardly from the cabin wall, the lower part of the screen terminating substantially at the top of each frame 22 when the latter is disposed in a vertical position. These screens 28 are located adjacent each frame 22, but not at each frame 23, as they comprise means to define adjacent compartments. A removable screen portion 30 is profiled to slide between the frame 22 and the screen 28 to complete the closure between compartments when the latter are made up for sleeping. From the description thus far given, which relates principally to seating and to arrangements for making up a lower berth, it will be noted that the lower berth is made up upon the floor 12 with the screens 28 and 30 and the apron 26 in place, and with the panelled seat frames 22 disposed in a vertical position. The mattress for the lower berth is comprised by seat cushions 17 and back cushions 25. The conventional curtains for each compartment, adjacent the aisle, would be provided, but are not shown, since they are well known. A recumbent passenger is thus afforded full privacy and the berth is located well above the aisle floor 11, so that the passenger is not subject to floor drafts, yet, the berth is below the seat level so that a considerable saving in head space is afforded to enable upper and lower berths to be utilized in a cabin whose height is limited. When made up for sleeping, each frame 23 is stripped of its slip cover and cushions, and thus forms a sort of arch over the middle of the lower berth space through which the body of the sleeping passenger passes with no discomfort to him. Incidentally, adjustable brackets such as 32 are provided between the seat frames 22 and 23 and their respective end panels 15 to adjust the tilt of the seat backs for either the seating or sleeping arrangements of the cabin.

The upper berth organization comprises a berth frame 34 having an extension 35 along its inner edge, the ends of the inner edge of the berth frames 34 being provided with projection 36 engaged in sloping guideways 38 fixed to the screens 28. The guideways 38 are provided with horizontal offset portions 39 and 40 at their upper and lower ends, respectively. The aisle edges of the upper berth, at their ends, are provided with projections 41 engageable in open-ended sockets 42 on the lower inner corners of the screens 30. If the berth 34 be adjusted for the sleeping position, the projections 36 engage the guide ends 39 and the projections 41 engage the fittings 42, thus supporting the berth frame in a horizontal position. The extension 35 forms a partition between the upper and lower berth spaces adjacent the side wall of the fuselage which, at the level of the upper berth, has a considerable inward slope due to its circular form. The berth proper is accordingly spaced from the cabin wall in order to provide adequate head room in the upper berth space. The edge of the extension 35 nearest to the cabin wall is provided with one or more fittings 44, shown in detail in Figs. 5 and 6, which releasably engage receptacles 46 attached to the cabin wall. A locking dog 47, pivoted to the fitting 44, releasably engages a shoulder 48 formed on the receptacle 46. The dog 47 is resiliently urged toward engagement with the receptacle 46 by a spring 49. When the fitting 44 is properly engaged with the receptacle 46, the whole upper berth structure is retained in position with respect to the cabin wall and, by the engagement of the projections 41 and 36 with their guide elements, the berth is held against movement from a horizontal plane. Likewise, the engagement of the fittings 44 with the receptacles, holds the screen 30 in place against inadvertent withdrawal.

To stow the upper berth, the fittings 44 are detached from the receptacles 46, and the inner edge of the berth frame is moved upwardly along the guides 38 until the projections 36 engage the guide ends 40, wherefore the inner edge of the upper berth is elevated, and the other edge may be raised to a position close to the upper part of the cabin wall, as indicated in Fig. 4. To support the upper berth assembly during shifting thereof, straps 50 are hooked to the cabin roof at 51, and are provided with D-rings 52 at their lower ends. The D-rings 52 may be attached to hooks 53 or 54 on the lower side of the berth frame 34. These are used as follows: If the berth be made up for sleeping and it is intended to stow same, the fittings 44 are first released, the aisle edge of the berth frame is lifted, and the D-rings temporarily are slipped over the hooks 54, as shown in position A in Fig. 1. Then, the berth frame is pulled toward the aisle and the cabin edge thereof raised so that the projections 36 engage the guide ends 40 as in position B in Fig. 1. Then, the aisle edge of the berth is raised to the completely stowed position and the D-rings 52 are finally attached to the hooks 53, whereby the berth is firmly secured in its stowed position. Preparation of the berth for sleeping is accomplished by a reversal of the above indicated sequence of operations. When in the sleeping position, the straps 50 assist in supporting the aisle edge of the upper berth.

It will be noted that when stowed, the upper berth lies as close to the uppermost wall, or ceiling, of the cabin as is possible, affording adequate head room in the passenger compartment when the latter is made up for seated passengers.

The general organization herein disclosed, particularly as relates to the passenger seats and lower berth, permits of tandem seating of passengers instead of the conventional face-to-face seating without encroaching upon the room available for the sleeping arrangement. Likewise, the arrangement herein disclosed permits of a saving in space and an increase in passenger comfort in virtue of the use of tilting seat backs, which seat backs coincidentally form compartment partitions. It will likewise be noted that the elevated auxiliary floor arrangement permits of a re-arrangement of the compartment between sleeping and seating dispositions without interfering with the stowage of transient baggage placed between the floors 11 and 12.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a compartment in a substantially circular aircraft cabin, a lower floor comprising a chord of the circular section of the cabin, elevated floor portions, parallel to the base floor, on either side of the cabin defining therebetween an aisle, the space between the lower and elevated floors providing for baggage stowage; partition walls extending vertically upwardly from the elevated floor defining compartments for seated passengers, said walls being tiltable to provide a backrest, and demountable seats associated with said walls, raised above the elevated floor level.

2. In a convertible sleeping compartment, a series of tandem arranged back rests rising from the compartment floor, alternate rests being panels, and the other alternate rests being open skeleton frames, end walls adjacent each back rest, and removable seats carried adjacent the rests by said end walls and the cabin wall, said seats being removable to provide a clear sleeping space between panel back rests, said space being centrally bridged by the intermediate skeleton back rest.

3. In a convertible sleeping compartment, a series of tandem arranged parallel panels defining adjacent compartments when the latter are converted for sleeping accommodation, said panels being hinged for movement to a substantially vertical position, for the sleeping arrangement, and to a tilted position to provide seat backs when the compartments are converted for seating accommodation, tiltable skeleton frames intermediate said panels, and cushions attachable to said frames to provide seat backs, said cushions being removable to provide a clear space through the frame when the compartment is arranged for sleeping.

4. In a convertible sleeping compartment, tandem arranged removable seats comprising seat frames, panels swingable thereon to provide back rests for the seats, and to provide compartment partitions for defining the compartments when made up for sleeping, said panels terminating, at their lower edge, at seat level to provide foot room for seated passengers, and displaceable aprons extending from the floor to the panel lower edges to complete the compartment closure for sleeping accommodation, the removable seats being placeable on the floor between said aprons to form berth mattresses.

5. In a convertible sleeping compartment having end walls, sloping tracks in said end walls, a stowable upper berth between the end walls having means at its inner edge engaging said tracks, and means for supporting the outer edge of said berth in an active, substantially horizontal position wherein the engaging means are in the lower ends of said tracks and in a stowed position wherein the engaging means are in the upper ends of said tracks, said supporting means comprising flexible tension members supported from the compartment ceiling and devices for attaching said members, at various effective lengths, to the outer edge of the berth.

6. In a convertible sleeping compartment in a substantially circular aircraft cabin, a stowable upper berth disposable in an active position spaced from the cabin wall to increase headroom thereover beneath the curved cabin wall and extending substantially horizontally therefrom and in a stowed position close to the cabin roof, an apron carried by the berth filling the space between the cabin wall and the berth edge, and means for detachably securing said apron to the cabin wall.

7. In a convertible compartment, a plurality of tandem seat frame units, alternate units comprising skeleton back frames and removable back cushions thereon, the other alternate frame units comprising back frames and cushions adapted to form end sleeping compartment partitions, said first alternate frame back cushions being removable to allow of the body of a recumbent passenger to pass therethrough.

8. In a convertible compartment, a plurality of tandem seat frame and partition units, a displaceable seat cushion for each unit adapted to be placed on the floor for use as a mattress element, said frames comprising seat back members movable to a vertical position to comprise sleeping compartment partitions and being wholly covered from floor to top and movable to a tilted position to comprise back rests when the seats are disposed for seated passengers.

9. In a convertible compartment, a plurality of tandem seat frame units, a displaceable seat cushion for each unit, said frames comprising seat back members movable to a vertical position to comprise sleeping compartment partitions and movable to a tilted position to comprise back rests for seated passengers, said compartment partition frames including panels, and back cushions, and other frames between said panelled frames comprising skeleton structures upon which back cushions are attachable, said skeleton structures providing clear space therethrough upon removal of the back cushions therefrom.

10. In a convertible sleeping compartment, tandem arranged seat units comprising alternate panelled back frames and alternate skeleton back frames, said frames being tiltable when used in connection with the seats and being movable to a vertical position for use in connection with the sleeping compartment, said panelled back frames comprising compartment partitions, back cushions removably carried by said back frames, and seat cushions removably secured to said seat units.

11. In an aisle compartment having a side wall and ceiling, an upper berth frame, means supporting the wall edge of said frame either at a high stowing level or at a low level for berth occupancy, a strap suspended from said ceiling having a lower terminal, and two fittings spaced across the frame with either one of which said terminal is engageable, that fitting nearest the aisle being located for engagement by the fitting and for frame support by the strap when the frame is positioned for use as a berth, and that fitting nearest the wall being located for engagement by the terminal and for frame support by the strap when the frame is elevated for stowing.

12. In an aisle compartment having a side wall and ceiling, an upper berth frame, means supporting the wall edge of said frame either at a high stowing level or at a low level for berth occupancy, a strap suspended from said ceiling having a lower terminal, and two fittings spaced across the frame with either one of which said terminal is engageable, that fitting nearest the aisle being located for engagement by the fitting and for frame support by the strap when the frame is positioned for use as a berth, that fitting nearest the wall being located for engagement by the terminal and for frame support by the strap when the frame is elevated for stowing, and a third fitting intermediate the first two with which said terminal is engageable for frame support by the strap in a position between those for stowing and occupancy, in which position the wall edge of the berth is shiftable to the upper or lower positions.

GEORGE A. PAGE, JR.